(12) United States Patent
Scholler et al.

(10) Patent No.: US 9,382,077 B2
(45) Date of Patent: Jul. 5, 2016

(54) MULTI-ZONE CONVEYOR SYSTEM HAVING LAN BASED CONTROL

(71) Applicant: Milwaukee Electronics Corporation, Milwaukee, WI (US)

(72) Inventors: James Scholler, Brookfield, WI (US); David V. Hall, Cookeville, TN (US)

(73) Assignee: Milwaukee Electronics Corporation, Milwaukee, WI (US)

( * ) Notice: Subject to any disclaimer, the term of this patent is extended or adjusted under 35 U.S.C. 154(b) by 111 days.

(21) Appl. No.: 14/074,350

(22) Filed: Nov. 7, 2013

(65) Prior Publication Data

US 2014/0129026 A1 May 8, 2014

Related U.S. Application Data

(60) Provisional application No. 61/724,128, filed on Nov. 8, 2012.

(51) Int. Cl.
G06F 7/00 (2006.01)
B65G 47/52 (2006.01)
B65G 37/00 (2006.01)
G05B 19/418 (2006.01)

(52) U.S. Cl.
CPC ............. *B65G 47/52* (2013.01); *B65G 37/00* (2013.01); *G05B 19/41815* (2013.01); *Y02P 90/08* (2015.11); *Y02P 90/18* (2015.11); *Y02P 90/185* (2015.11)

(58) Field of Classification Search
None
See application file for complete search history.

(56) References Cited

U.S. PATENT DOCUMENTS

| | | | |
|---|---|---|---|
| 6,035,999 A | 3/2000 | Hall | |
| 6,244,421 B1 | 6/2001 | Hall | |
| 6,253,906 B1 | 7/2001 | Hall | |
| 7,007,807 B1* | 3/2006 | Stockard | A21B 1/48 209/592 |
| 7,035,714 B2 | 4/2006 | Anderson et al. | |
| 7,395,913 B1 | 7/2008 | Canapa | |
| 8,050,795 B2 | 11/2011 | Dollens | |
| 2006/0030968 A1* | 2/2006 | Ko | H01R 27/00 700/213 |

* cited by examiner

*Primary Examiner* — Yolanda Cumbess
(74) *Attorney, Agent, or Firm* — Boyle Fredrickson, S.C.

(57) ABSTRACT

A control system for a conveyor system having one or more upstream and downstream conveyor zones and whose operation effectuates transportation of a series of loads via operation of motors and drive arrangements associated with the respective conveyor zones. The control system includes a Local Area Network (LAN) connection between each component of the control arrangement associated with each zone control such that status and operational information associated with the configuration or operation of each conveyor zone, including the zone motor, can be communicated to other conveyor zones so that operation of each conveyor zone can be manipulated in a controlled manner in response to changes to operation of other conveyor zones.

17 Claims, 5 Drawing Sheets

MULTI-ZONE CONVEYOR SYSTEM HAVING LAN BASED CONTROL

CROSS-REFERENCE TO RELATED APPLICATIONS

This application claims priority to U.S. Provisional Patent Application Ser. No. 61/724,128, filed on Nov. 8, 2012, titled Multi-Zone Conveyor System Having LAN Based Control, and the entire contents of which are incorporated herein.

BACKGROUND OF THE INVENTION

This invention relates generally to multi-zone conveyor control systems. More specifically, the invention relates to a conveyor control system that utilizes a local area network (LAN) for communicating instructions between multiple discrete conveyors that are oriented to form various conveyor zones that are connected to one another to advance or convey goods or products referred to as loads in a controlled manner.

Conveyor systems generally comprise discrete sections, or zones, that are made up of individually operable conveyor systems to translate goods or products in a desired manner or sequence. Each zone may have separate controls, and the zones and associated controls are connected with other zones to form a larger conveying system. Commonly, a central controller oversees and controlled operation of the conveying system to effectuate the desired translation of the goods or products therethrough or across. Such systems commonly require user interaction with the central controller to manipulate operation of any of the respective zones of the conveyor system.

Coordination between zones requires communication of commands as well as feedback related to the operating status and loading between zones. Each zone may receive, for example, a command related to the speed at which the zone is to be driven, the direction of travel for the zone, and status of the presence or absence of items in the zone or in one or more adjacent or near-by zones. Commonly, a separate conductor is provided to carry individual signals between zones and the central or a master control. As the size and complexity of conveying system has increased, the size and complexity of the cabling has similarly increased. The increasing amount of wiring adds time and cost to installations and requires mounting considerations to secure the wire harnesses to the conveyor system.

In recent years, networked communications have been introduced to reduce the amount of wiring in the conveyor system. The zones may be interconnected via a suitable communications cable, significantly reducing the amount of wiring required within the conveyor system. Although networked communications reduces zone-to-zone wiring, it generally does not reduce the amount of wiring within a zone. Within each zone, the network is connected to a controller having a communication interface configured to transmit and/or receive data from the network. From the controller, discrete wiring is still required between the zone controller and each of the motors and sensors in the zone and communication with a master controller maintains the overall operation of the multiple zone conveyors. Such configurations commonly rely on an operative association of a master control with one or more slave controls wherein each slave control is associated with operation of only a discrete conveyor zone. Manipulation or changes to the operation of any discrete zone can commonly only be effectuated via user interaction with the central or master control.

That is, such configurations limit interaction with the conveyor system in that temporary interference with conveyance of goods or products of any of the discrete zones is initiated at a master control rather than any of the discrete zone conveyor controls. Absent interaction with the master control, slave controls are commonly unable to interfere with operation of any of conveyors associated with any of the remaining zones. Such configurations detract from the ability of the conveyor system to adequately react to changes associated with operation of any of the discrete conveyor zones and limit the ability of personnel associated with any discrete zone to maintain the desired operation of the conveyor system in response to intermediate interruptions associated with the operation of any discrete zone aside from interaction with the master control.

Thus, it is desirable to provide a control system for conveying systems having simplified wiring and more uniform components to reduce the time and expense associated with materials and installation and wherein each zone control can be uniquely configured to manipulate operation of a respective zone in a manner that can alter operation of remaining zones in a manner responsive to changes to the operation of a particular zone to improve efficiencies associated with operation of the overall conveyor system.

SUMMARY OF THE INVENTION

The present invention discloses a multi-zone conveyor system and control arrangement associated therewith that overcomes one or more of the shortcomings disclosed above. One aspect of the invention discloses a conveyor control system that utilizes a local area network (LAN) for communicating instructions between the controls of multiple discrete conveyors that are oriented to form various conveyor zones that are connected to one another to advance or convey goods or products referred to as loads in a controlled manner.

The present invention contemplates a control arrangement and related zone conveyor system that utilizes a LAN based communication protocol to communicate operational instructions and status signals to and from the discrete conveyors of the zones for manipulating operation of a conveyor of any given zone or zones in response to changes in status of a load or operation of a conveyor in the same or any other zone of the underlying arrangement. The LAN communication interface reduces the amount of wiring associated with prior art configurations by replacing multiple discrete control signals connected between each of the respective units, conveyors, or conveyor zones with a single network cable. The LAN also provides enhanced control of individual zones, for example, by having variable speed control, directional control, or communicating faults in any given zone to a master control or controller.

It is further envisioned that one or more of the respective zone controls can include an rx and/or a tx receiver/transmitter to each board or controller associated with a respective conveyor, conveyor zone, or upstream/downstream side of the conveyor system for bidirectional communication of operational information between the respective conveyors or zones associated with a given conveyor system or configuration. One aspect of the invention discloses a control arrangement that includes a master control that is configured to communicate instructions and receive information from a control associated with each discrete conveyor or conveyor zone thereby negating the need for discrete potentiometer speed control associated with each discrete conveyors or conveyor zone. Rather, conveyor motor and/or speed control instructions can be communicated in a bidirectional manner between each respective conveyor and/or conveyor zone as a function of operation of any other conveyor and as an analog input rather than discrete conveyor potentiometer-type controls. It is further appreciated that communication between the control units and operational sensors and others of either the control units and/or the operation sensors could be provided in a wireless communication methodology.

In a preferred aspect, each controller of the control arrangement has the same construction as each other controller of the control arrangement such that any of the controllers can be configured as master, auxiliary, intermediate, skip, or end conveyor controls. In another preferred aspect, each controller includes one or more selectable inputs and/or one or more outputs that are constructed to allow manual configuration of the respective controller from locations proximate the respective controls and/or allow assessment of the operating condition of the conveyor zone associated with the respective controller from locations proximate the respective control and/or with wireless devices that communicate therewith.

These and other aspects and advantages of the invention will be better appreciated and understood when considered in conjunction with the following description and the accompanying drawings. It should be understood, however, that the following description, while indicating representative embodiments of the present invention, is given by way of illustration and not of limitation. Many changes and modifications may be made within the scope of the present invention without departing from the spirit thereof, and the invention includes all such modifications.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
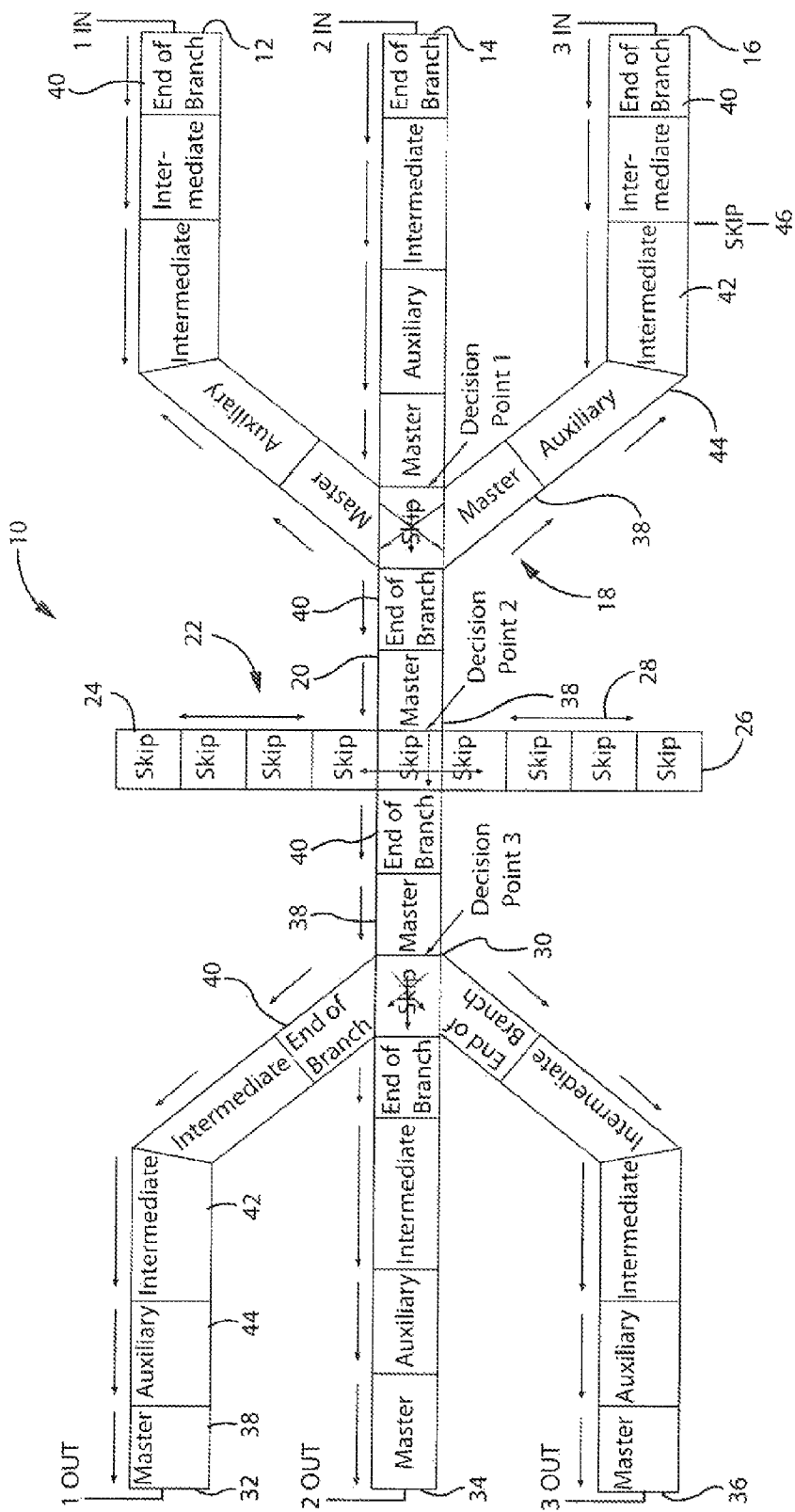
FIG. 1 is a schematic plan view of a multi-zone conveyor system having a conveyor control system according to the present invention.

In describing the representative embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

FIG. 1 shows an exemplary conveyor system 10 equipped with a control system or control arrangement according to the present invention. The conveyor system 10 includes three input conveyor zones or branches 12, 14, 16 that converge at a merge point 18 and translate loads to a main conveyor zone or branch 20. A transfer zone or station 22, which includes one or more alternate perpendicularly oriented conveyor zones or load conveyors 24, 26 that allow off-line transfer activities and/or load skip zones that allow feeding and off-loading, merge from right, merge from left, transfer right, transfer left, divert right or divert left load manipulations. It is appreciated that the number and orientation of the conveyor zones or discrete conveyors associated with the underlying conveyor system could be provided in virtually any orientation relative to one another to effectuate the desired transfer, translation, or movement of the goods and products. Transfer station 22 may be configured to handle axial transfers as well as lifting and lowering respective loads to generate a desired load sequence toward a discharge direction or side 28 of transfer station 22.

Downstream of transfer station 22, main branch 20 includes a merge point 30 with one or more output zones or branches 32, 34, 36 associated with moving respective loads for further downstream processing. Each of input branches 12, 14, 16, main branch 20, and output branches 32, 34, 36 include a master conveyor 38 at an end of branch conveyor 40 and can include one or more intermediate conveyors 42, one or more auxiliary conveyors 44, and one or more skip stations 46. As described further below with respect to FIGS. 2-5, the operation of discrete conveyors 38, 40, 42, 44 and/or skip stations 46 is controlled by a control arrangement associated with communicating load status, position and conveyor operation information, conveyor motor and control feedback information between each respective conveyor zone or conveyor 38, 40, 42, 44 associated with each of input branches 12, 14, 16, main branch 20, transfer station 22 and output branches 32, 34, 36.

Understandably, the illustrated configuration of the various conveyors and branches associated with system 10 is merely exemplary of one conveyor system configuration usable with the present invention. Applicant's U.S. Pat. Nos. 6,035,999; 6,244,421; and 6,253,906 disclose further examples of conveyor system configurations useable with the present invention but it is appreciated that such conveyor systems can be provided in a plethora of configurations to satisfy virtually any demands or desires for load transfer, shift, and sequencing. It is further appreciated that the orientation of the various conveyors and conveyor zones can be provided in virtually any configuration to satisfy constraints associated with the desired distribution or movement of loads and the spatial constraints associated with a given operating environment.

Figure 2:
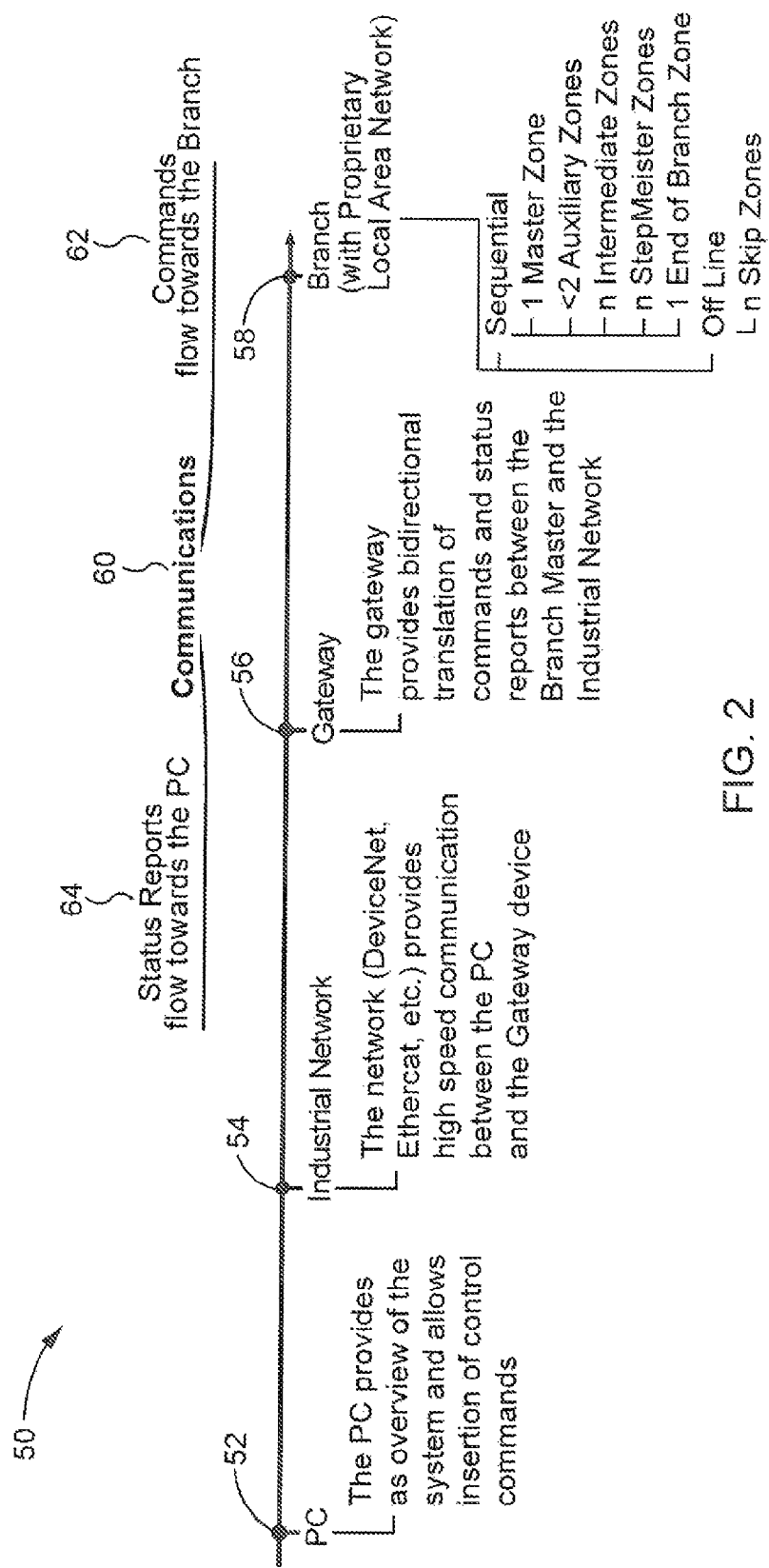
FIG. 2 is a graphical representation of the control system of the multi-zone conveyor shown in FIG. 1.
Figure 3:
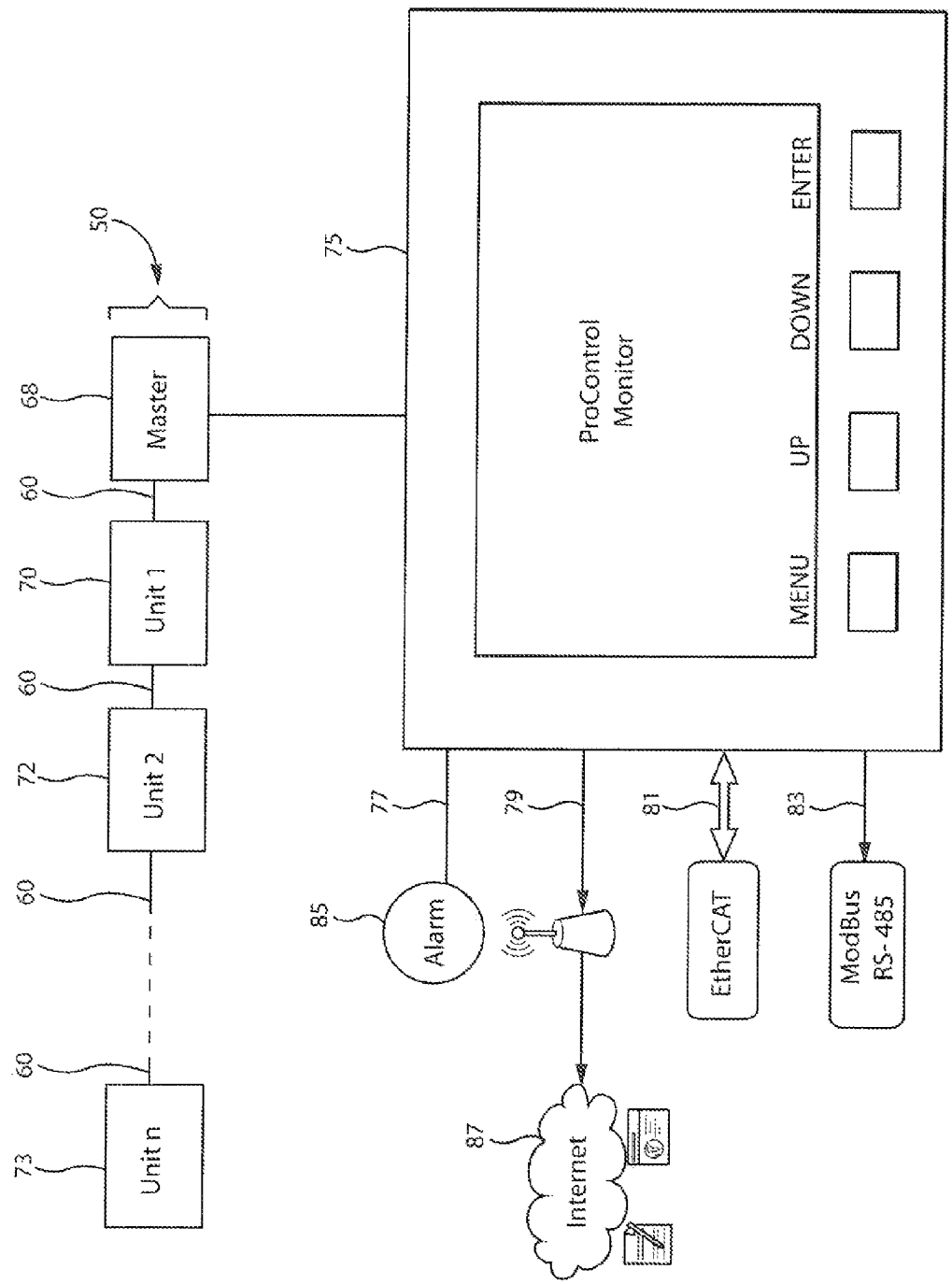
FIG. 3 is a schematic block diagram of the control system shown in FIG. 2.

FIGS. 2 and 3 show graphic representations of a control arrangement 50 of conveyor system 10 shown in FIG. 1 according to the present invention. As shown in FIG. 2, control arrangement 50 may include a dedicated control interface 52 such as a dedicated system monitor, a personal computer, which may be a laptop, a tablet, a smart phone, or a dedicated wireless device, server or other such functional interface, or cloud or internet supported interface that allows a user to interface with control arrangement 50 to provide an overview of system operation and control as well as development and insertion of control commands associated with the operation thereof. As explained further below with respect to FIG. 3, it is appreciated that the desired control of conveyor system 50 can be provided in various configurations such a series of zones controls and/or via inclusion of extraneous communications connectivity to allow local and remote assessment and manipulation of operation of control system 50.

Still referring to FIG. 2, personal computer 52 may be connected to an industrial network 54 that provides communication between the personal computer 52 and the gateway device 56. Gateway device 56 provides bidirectional translation of commands and status reports and/or indicators between the respective master conveyors in the industrial network 54 and/or personal computer 52 of control arrangement 50. Gateway device 56 communicates with conveyor system 10 and/or a branch control 58 associated therewith. Branch control 58 is configured to communicate with the one or more master, auxiliary, intermediate, step, skip, and end conveyors and/or zones of conveyor system 10. Control arrangement 50 includes a communication system 60 that allows bidirectional flow between branch 58 and PC 52 of commands 62 directed towards branch 58 and operational status or load reports 64 toward computer 52.

Referring to FIG. 3, it is appreciated that control system 50 can be configured to provide the desired operation of conveyor system 10 in a configuration wherein the control system includes only a number of zone controls 68, 70, 72, 73 wherein one of the respective zone controls is configured as a master control and the remaining controls associated with the respective zones are designated as slave controls. It is further appreciated that when provided in such a configuration, interaction with any given zone control of control system 50 allows manipulation of the discrete zone and can result in changes to the operation of remaining zones as explained further below with respect to FIGS. 4-8.

Preferably, each control 68, 70, 72, 73 has the same construction such that a user can designate any of the controls of a given system as a master control associated with operation of the underlying system and designation of the remaining zone controls as zone controls that are subservient to operating conditions or instructions communicated from the master zone control. Regardless of the number of zone controls associated with a given conveyor system, each control 68, 70, 72, 73 can preferably be configured to assess information regarding the discrete operation of the pertinent zone associated with the given control, such as direction of operation of a particular zone conveyor and drive system or motor operation conditions, and communicate the information to other controls associated with the particular conveyor system configuration. Such a construction allows proactive attendance to changes in the operating conditions of the respective conveyor system and can mitigate the consequences associated with failure or deviation relative to a desired operating condition, of a discrete zone of the conveyor system.

Still referring to FIG. 3, as alluded to above, control system 50 can include one or more interfaces that can improve the convenience of user interaction with control system 50. For example, control system 50 can be configured to communicate with an optional dedicated monitoring device 75 rather than, or in addition to, the optional personal computer 52 as disclosed above with respect to FIG. 2. Monitoring device 75 is constructed to provide alarm and fault condition and information, allow identification of the zone experiencing fault conditions, maintain or record fault events and allow remote access for interaction with any of the controls 68, 70, 72, 73 associated with a particular conveyor system 10.

Whether provided as a general application personal computer 52 or a dedicated monitoring device 75, control system 50 can include one or more optional communication protocols 77, 79, 81, 83 to enhance the functionality of control system 50. It is appreciated that optional communication protocols 77, 79, 81, 83 can be wired and/or wireless and configured to accommodate local or remote alert or alarm conditions 85 and/or cloud or internet based interaction, assessment, or manipulation 87 of control system 50. It is envisioned that the remote interaction 87 can be effectuated via a smart phone, a tablet, and/or software application whose operation is based or facilitated through a web portal to accommodate the desired interaction with control system 50 of conveyor system 10 for assessing, configuring, and/or manipulating the operation of the underlying conveyor system 10.

Figure 5:
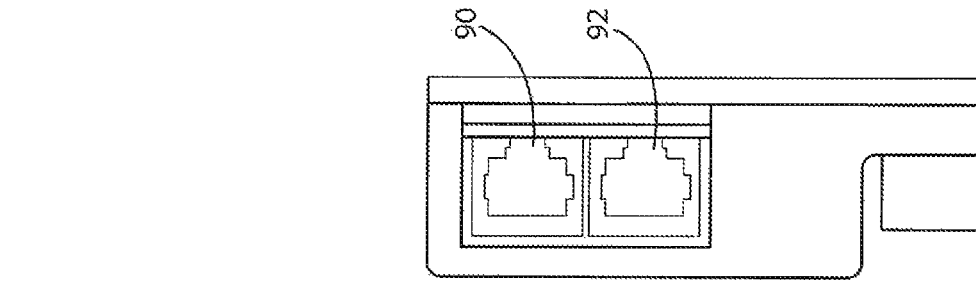
FIG. 5 is a side elevation view of the controller shown in FIG. 4 and shows the LAN connections associated with each controller.
Figure 4:
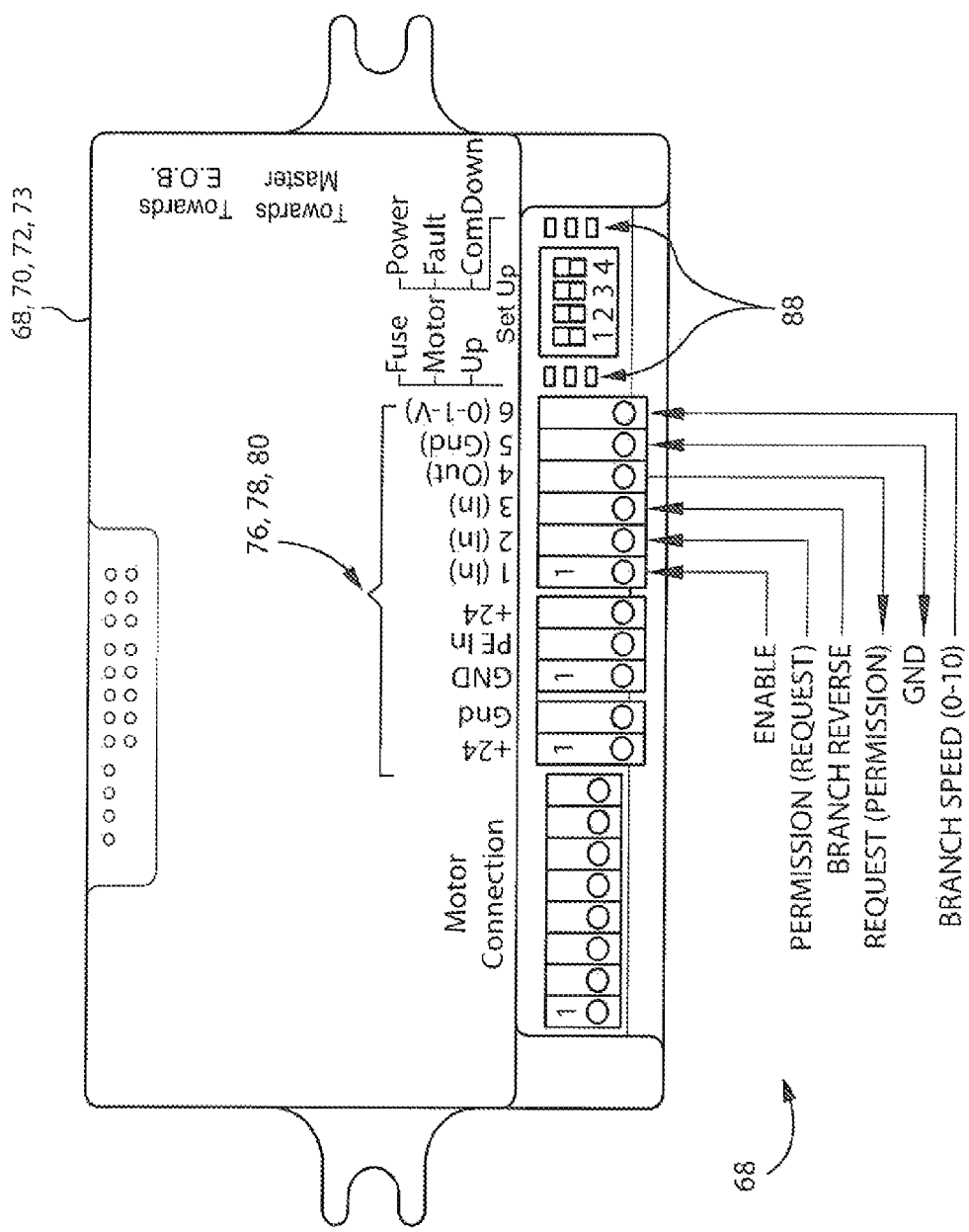
FIG. 4 is a plan view of a controller of the control system shown in FIG. 2.

FIGS. 4 and 5 show a top plan and side elevation view of any of the controllers associated with each of the master conveyor control 68, auxiliary conveyor control 70, an intermediate conveyor control 72, and end zone conveyor control 73 respectively, associated with each respective branch or zone of conveyor system 10. Preferably, the construction of each zone controller is the same as the construction of the controller associated with any other zone of conveyor system 10 but each control 68, 70, 72, 73 can be configured to control operation of the respective zone associated in a manner consistent with the underlying objective of the discrete conveyor zone and in a manner that allows each zone to change operation as a function of instantaneous conditions associated with other zones as explained further below. Each controller 68, 70, 72, 73 includes a plurality of input/output pins 76, 78, 80 associated with gateway 56 that can by their own operation provide discrete control functions that are accessible through the housing associated with a respective controller 68, 70, 72, 73 and/or upstream instructional devices associated with the respective location or designation of the discrete conveyors or conveyor zones as a master, branch, intermediate, or auxiliary conveyor.

It is further appreciated that one or more of input/output pins 76, 78, 80 could be configured to allow physical interaction with a portable instruction or monitoring device, such as control 75 (FIG. 3) allow user interaction with any of controllers 68, 70, 72, 73.

Alternatively, it is envisioned that one or more of controllers 68, 70, 72, 73 be provided with one or more externally operable control functions, such as switches or the like as disclosed below with respect to FIG. 6-8, to allow physical interaction and/or manipulation of the operating instructions associated with a particular control 68, 70, 72, 73. As explained further below, each controller 68, 70, 72, 73 can include one or more switches 82, 84, 86, 87 that can be used to designate the respective operation of the respective controller 68, 70, 72, 73 and the serial connectivity therebetween for the desired operation of the respective controller.

Figure 6:
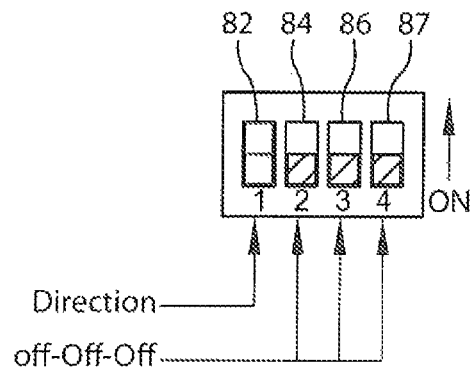
FIGS. 6-8 are detailed views of a user interface of the controller shown in FIG. 4 with various discrete manual inputs in different positions for manipulating operation of each zone and the multi-zone conveyor system shown in FIG. 1.
Figure 7:
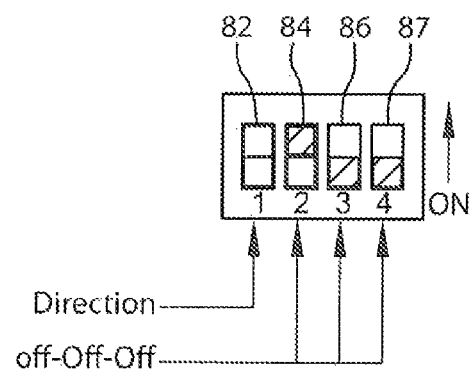
Figure 8:
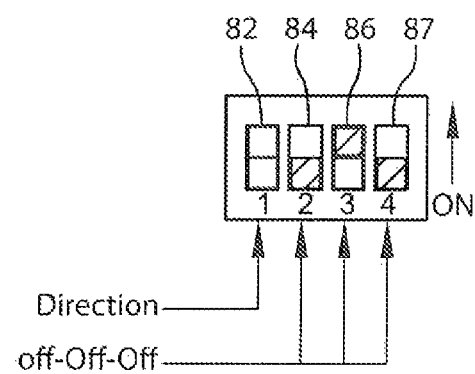

As shown in FIGS. 6-8, each of switches 82, 84, 86, 87 is movable to manipulate the operating characteristics associated with the respective controller 68, 70, 72, 73. It is appreciated that switches 82, 84, 86, 87 can be movable to alternate a designated direction of travel or operation associated with a respective conveyor or conveyor zone, designate a respective controller as a master, intermediate, auxiliary, skip, end or other particular conveyor zone designation, provide a zone hold for load manipulation or workstation interaction, discrete zone speeds—which can be configured to override a branch speed—and other less common functions such as zone skips, control lifts, control cross load transfers, allow load accumulation for packing of oversized zones, or other operational instructions that may be contrary to a current configuration of the particular controller. Such a construction allows a controller having a general construction to the be configured for a particular operating situation or configuration in that any controller can be conveniently configured for a desired operation as a master, intermediate, auxiliary, end or other convey zone control.

Each controller 68, 70, 72, 73 also preferably includes one or more optional indicators 88 that indicate the operational status of one or more of a fuse condition, motor condition, power condition, fault condition, or a communication link status associated with the respective controller. It is further appreciated that indicators 88 can be configured to provide power and temperature conditions associated with any of the motors associated with operation of a respective zone of conveyor system 10. Indicators 88 allow expedient identification and assessment of operation of the respective conveyor zones from positions proximate the controller such that operators can expeditiously resolve any deviations from a desired operation of the conveyor zone associated with a particular conveyor zone as well as assess impending interruption conditions via inspection of indicators 88.

In addition to the serial circuit connections discussed above, each controller 68, 70, 72, 73 further includes at least one Local Area Network (LAN) connection 90, 92 configured to provide bi-directional communication between each of the controllers associated with a particular configuration of conveyor system 10. In one embodiment, each controller is connected to adjacent controllers, whether associated as a master, auxiliary, or intermediate conveyor, so that each controller associated with a respective conveyor system can both receive and transmit information related to the operation of the conveyor with which the respective controller is associated and/or any of the other conveyors associated with a respective conveyor system.

The bi-directional communication of each controller allows bi-directional communication associated with zero load pressure accumulation during operation of the respective conveyor system. As is commonly understood, one or more sensors or switches commonly monitor the progression of load materials through the conveyor system. The bi-directional communication of discrete conveyor operation negates a manipulation of the load sensors or detection systems to provide load status information between adjacent conveyor systems. The multiple conveyor bi-directional communication associated with the LAN communication connectivity distributes the logic associated with load progression and position and conveyor operation beyond the discrete conveyor associated with such sensor devices. Switches 82, 84, 86, 87 and indicators 88 allow the physical configuration of controls 68, 70, 72, 73 for the intended operation and assessment of the operating condition of the particular conveyor zone from a location proximate the respective control and the LAN communication protocol provides for remote assessment and manipulation of the operating direction and speed of any given conveyor, allows communication of conveyor motor and control feedback and diagnostic information between the respective conveyor zone controls, and manipulation of the operating mode of a respective conveyor, as compared to the conveyor specific potentiometer or switch adjusted conveyor speed, mode, and direction common to many prior art conveyor systems.

The integrated LAN communication, and the bi-directional communication associated therewith, of control arrangement 50 allows automatic identification of individual zones, automatic reporting of discrete zone faults including operating status of the zone motor, monitoring of zone motor direction, motor speed, sensor status or condition, specific faults, as well as load cycle status. The control arrangement also allows for remote zone operation manipulation including the creation of zone holds and/or remote manipulation of the discrete zone operating speeds. The serial and LAN connections also allows for the operation and control of up to 255 zones per branch or a respective conveyor system.

With respect to discrete branches of conveyor system 10, control arrangement 50 is configured to allow manipulation of the branch operating direction and branch speed, and to change the operating mode of the branch between various modes including for example default zero load pressure accumulation, high throughput operation, and/or delayed release. With respect to discrete zones, control arrangement can be configured to provide a zone hold for load manipulation or workstations, discrete zone speeds—which can be configured to override a branch speed—and other less common functions such as zone skips, control lifts, control cross load transfers, and allow load accumulation for packing of oversized zones.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

What we claim is:

1. A conveyor control system for controlling a conveyor system configured to transport a series of loads, the conveyor system including a series of conveyor zones including at least one downstream conveyor zone and at least one upstream conveyor zone, each conveyor of each conveyor zone having at least one motor configured to control operation of the respective conveyor of the respective conveyor zone and a selectively operable drive arrangement interconnected with each conveyor zone for operating the at least one motor of each conveyor zone to advance the loads along the conveyor system, the conveyor control system comprising:

a plurality of zone controllers, wherein each zone controller corresponds to one of the series of conveyor zones and the zone controller includes a plurality of user settable switches and a plurality of operating functions stored in the zone controller, wherein the plurality of user settable switches select at least one of the plurality of operating functions for execution on the zone controller to define, at least in part, operation of the zone controller; and a Local Area Network (LAN) connection between each of the plurality of zone controllers, wherein each of the plurality of zone controllers receives data via the LAN connection from at least one other zone controller corresponding to the operation of the at least one other zone controller and wherein data identifying a change in the operation of the at least one other zone controller received via the LAN connection defines, at leas in part, operation of the zone controller.

2. The conveyor control system of claim 1, wherein the zone controller of each upstream conveyor zone and the zone controller of each downstream conveyor zone are interconnected with each other such that the zone controller of each upstream conveyor zone has information regarding the status of each downstream conveyor and the zone controller of each downstream conveyor has information regarding the status of each upstream conveyor.

3. The conveyor control system of claim 2 wherein each of the upstream and downstream conveyors can send and receive information regarding each conveyor to each other conveyor of each conveyor zone across the LAN connection.

4. The conveyor control system of claim 2 wherein each zone controller is constructed to receive a plurality of user inputs associated with manipulating operation of a respective conveyor zone associated with the zone controller via the user settable switches.

5. The conveyor control system of claim 4 wherein one of the plurality of user inputs manipulates a direction of operation of the respective conveyor zone.

6. The conveyor control system of claim 1 wherein arrangement each conveyor zone is configured to manipulate operation of the corresponding drive arrangements in response to a zone controller associated with the conveyor zone.

7. The conveyor control system of claim 1 wherein the conveyor control system is configured to manipulate operation of the zone controller in any of the conveyor zones in response to changes in the operation of the zone controller in any of the other conveyor zones via instructions communicated to the control arrangement over the LAN connection.

8. A conveyor system comprising:
   a series of conveyor zones that include a respective conveyor zone and at least one of a downstream conveyor zone an upstream conveyor zone, and a parallel conveyor zone;
   at least one motor configured to control operation of a respective conveyor of each of the series of conveyor zones and a selectively operable drive arrangement connected between each motor and the respective conveyor for operating each conveyor zone to advance loads along the conveyor system: and
   a control system that is operable to manipulate operation of the upstream, downstream, and parallel conveyor zones to manipulate translation of any loads carried by the upstream, downstream, and parallel conveyor zones in response to changes in operation of a respective conveyor zone to achieve a desired product translation, the control system comprising:
   a controller associated with each conveyor zone and configured to control operation of the drive arrangement associated with each respective conveyor, each controller including a plurality of user settable switches and a plurality of operating functions stored in the zone controller wherein the plurality of user settable switches select at least one of the plurality functions for execution on the zone controller to define, at least in part, operation of the respective conveyor zone; and
   a Local Area Network (LAN) connection extending between each controller of the conveyor system that communicates information between each controller of the conveyor system as to the operation of each respective conveyor zone so that the operation of each conveyor zone can be manipulated in a controlled manner in response to the operation of each of the other conveyor zones.

9. The conveyor system of claim 8 wherein each controller includes the same operating functions as each of other the other controllers.

10. The conveyor system of claim 8 wherein operation of each controller can be changed responsive to receiving the operation of a controller associated with another conveyor zone via the LAN connection.

11. The conveyor system of claim 8 wherein the plurality of operating functions for each controller includes a zone hold instruction during which operation of the conveyor zone associated with the controller and upstream conveyor zones is suspended and operation of downstream conveyor zones and parallel conveyor zones one of continue or are suspended.

12. The conveyor system of claim 8 wherein at least one of the controllers includes a wireless communication interface for communicating an operating status of the conveyor system to remote devices.

13. A method of controlling operation of a conveyor system that includes a first conveyor zone, multiple conveyor zones downstream from the first conveyor zone, and multiple conveyor zones upstream from the first conveyor zone wherein each of the first conveyor zone, the downstream and upstream conveyor zones are oriented for advancing a series of loads, the method comprising:
   configuring operation of a plurality of controllers, wherein each controller controls operation of one of the first conveyor zone, a downstream conveyor zone, and an upstream conveyor zone;
   establishing a Local Area Network (LAN) connection between the first conveyor zone and each oldie downstream and upstream conveyor zones with the respective controller for each conveyor zone;
   communicating the operation of each controller between each conveyor zone and from each of the conveyor zones across the LAN connection connected to a control arrangement configured to manipulate operation of each of the conveyor zones in response to the operation of each conveyor zone communicated across the LAN connections from any of the conveyor zones.

14. The method of claim 13 further comprising communicating a change of operation occurring in any of the plurality of controllers from the controller in which the change occurred to the controller of each of the other conveyor zones via the LAN connections, wherein the change of operation received at each of the other conveyor zones changes operation of the controller for the other conveyor zone.

15. The method of claim 13 wherein each of the plurality of controllers has the same construction.

16. The method of claim 13 further comprising manipulating a manual input of a respective controller to alter a direction of operation of a respective conveyor zone.

17. The method of claim 16 further comprising communicating information regarding the operating status of the motor of each respective conveyor zone to each of the other conveyor zones via the LAN connections.

* * * * *